(12) United States Patent
Kyle

(10) Patent No.: US 6,853,739 B2
(45) Date of Patent: *Feb. 8, 2005

(54) IDENTITY VERIFICATION SYSTEM

(75) Inventor: Wayne Kyle, Gauteng (ZA)

(73) Assignee: Bio Com, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/437,328

(22) Filed: May 13, 2003

(65) Prior Publication Data

US 2003/0215114 A1 Nov. 20, 2003

Related U.S. Application Data

(60) Provisional application No. 60/380,600, filed on May 15, 2002, and provisional application No. 60/381,905, filed on May 20, 2002.

(51) Int. Cl.[7] .................................................. G06K 9/00
(52) U.S. Cl. ........................ 382/115; 340/5.83; 713/186
(58) Field of Search ................................. 382/115, 116, 382/118, 124; 340/5.52, 5.53, 5.82, 5.83; 713/186

(56) References Cited

U.S. PATENT DOCUMENTS

| | | | |
|---|---|---|---|
| 5,071,168 A | 12/1991 | Shamos | 283/117 |
| 5,144,680 A | 9/1992 | Kobayashi et al. | 382/4 |
| 5,193,855 A | 3/1993 | Shamos | 283/117 |
| 5,259,025 A | 11/1993 | Monroe et al. | 380/23 |
| 5,321,751 A | 6/1994 | Ray et al. | 380/23 |
| 5,505,494 A | 4/1996 | Belluci et al. | 283/75 |
| 5,606,365 A | 2/1997 | Maurinus et al. | 348/222 |
| 5,644,645 A * | 7/1997 | Osuga | 382/124 |
| 5,777,571 A | 7/1998 | Chuang | 341/176 |
| 5,887,140 A * | 3/1999 | Itsumi et al. | 395/200.55 |
| 6,111,517 A | 8/2000 | Atick et al. | 340/825.34 |
| 6,137,895 A | 10/2000 | Al-Sheikh | 382/115 |
| 6,213,393 B1 | 4/2001 | Streicher et al. | 235/381 |
| 6,301,565 B1 | 10/2001 | Goodwin, III | 705/23 |
| 6,317,544 B1 * | 11/2001 | Diehl et al. | 385/115 |
| 2003/0053662 A1 * | 3/2003 | Evoy et al. | 382/115 |
| 2003/0217294 A1 * | 11/2003 | Kyle | 713/202 |

* cited by examiner

Primary Examiner—Andrew W. Johns
(74) Attorney, Agent, or Firm—Elizabeth R. Hall

(57) ABSTRACT

The present invention is a security system that utilizes an identity verification system having a biometrics component, such as but not limited to a face, fingerprint, or iris recognition system. The system connects a biometric data entry device such as a standard analogue or digital camera to a communication control device which captures, compresses and digitizes the biometric data as well as converts data from data input devices and sends the compressed and digitized biometric data along with the data from a data input device to a central processing unit for processing by a biometric recognition system and comparison to stored biometric data.

33 Claims, 10 Drawing Sheets

IDENTITY VERIFICATION SYSTEM

CROSS REFERENCE TO RELATED APPLICATIONS

This application claims priority to pending U.S. Provisional Patent Application Ser. No. 60/380,600, filed May 15, 2002 by inventor Wayne Kyle and entitled "Data and Image Capture, Compression and Verification System." and pending U.S. Provisional Patent Application Ser. No. 60/381,905, filed May 20, 2002 by inventor Wayne Kyle and entitled "Identity Verification System".

BACKGROUND OF THE INVENTION

1. Field of the Invention

The present invention relates generally to security systems, and more particularly, to security systems that utilize an identity verification system having a biometrics electronic recognition component.

2. Description of the Related Art

Recently there has been a global awareness of a need to increase the security of public places and transactions. It is particularly important to verify the identity of an individual and to verify that the individual is not a wanted terrorist or criminal. This need for increased security is especially true in sensitive areas such as airports, government buildings, border control points, sea ports, oil refineries, and the like.

Currently available security systems are exemplified by the security systems in place at an airport. The architecture of a typical existing passenger check-in terminal at an airport is illustrated in FIG. 1. Multiple verification points exist within an airport. A verification point being defined herein as the point where the actual physical transaction takes place and where the input data is entered.

When a traveler arrives at a check-in terminal or verification point, data identifying the traveler with the ticket purchased, seat assignment and the amount of luggage checked is entered into the local computer 12 from a keyboard 14 or a data input device 13. A scanner or other data input device 13 is available to enter frequent flyer miles and other information. Data input devices 13 such as magnetic swipe readers, proximity readers, barcode scanners, document scanners or similar devices are interfaced directly into the local computer 12 via communication ports. The local computer 12 may further process the data entered into the local computer 12, or it may send the information to a server 15 for storage and/or further processing.

The current passenger check-in system has no definitive and automated means for comparing the facial features or other biometric characteristics of the passenger with the photographic image on the passenger's passport or identification card. The operator at the passenger check-in terminal currently performs the only image comparison through the visual inspection of the passenger. The operator manually compares the face of the passenger with the photo in the passenger's passport or identification card. However, on the spot visual inspections are very subjective and prone to error.

Similarly, bank transactions occur at a variety of transaction points or verification points. Data identifying the customer with the details of the transaction, including the customer's account number, name, and other personal details may be entered into the local computer 12 from a keyboard 14 or a data input device 13. The local computer 12 may further process the data entered into the local computer 12 or it may be sent to a server 15 for storage and/or further processing. Again current bank transactions do not provide a definitive and automated means for comparing the facial features or other biometric characteristics of customers with a photographic image on a driver's license or other identification card. The operator at the transaction point must perform the only image comparison through a visual inspection.

Furthermore, secured access into restricted areas typically has little or no identity verification at all. A person wishing to enter a door, boom or turnstile presents a token or identification card to a data input device near the door, boom or turnstile. The data is sent back to the server controlling the access control system. The access control system checks a database of the access control server to verify that the token is valid or that the person associated with the identification card is authorized to enter the door, boom or turnstile. If the number on the token or identification card is authorized, the access control system will instruct, via electronic means, a magnetic lock or other locking mechanism that controls the door, boom or turnstile to release the lock and allow access to the person seeking entry. There is typically no visual verification of the person entering by an operator.

There exists a need to link an objective face recognition system with personal identifier data (e.g., passport number, account number or other unique identification number) to verify that a passenger or customer is indeed the person he/she claims to be and is not a known terrorist or criminal.

Furthermore a need exists to link multiple data input devices, data output devices, cameras and other electronic components that may be situated at a variety of verification points to a single processor to facilitate the identity verification process.

SUMMARY OF THE INVENTION

The present invention is a security system that utilizes an identity verification system having a biometrics component, including but not limited to a face, fingerprint, hand or iris recognition system. The system connects a biometric data entry device such as a standard analogue or digital camera to a communication control device which captures, compresses and digitizes the biometric data as well as converts data from data input devices and sends the compressed and digitized biometric data along with the data from a data input device to a central processing unit for processing by a biometric recognition system and comparison to stored biometric data.

One aspect of the present invention is an identity verification system, the verification system comprising: (a) entry means for recording biometric data; (b) a data input device; (c) display means for displaying information to a system operator; (d) a communication control device remote from said entry means, data input device and display means, said communication control device having (i) receiving means for receiving a set of biometric data from the entry means and a set of input data from the data input device, (ii) a first conversion means for selectably capturing a portion of the set of biometric data received from the entry means and converting said portion of captured biometric data into a compressed digital file of the captured biometric data, (iii) a second conversion means for formatting the set of input data into a network protocol standard, (iv) transmitting means for transmitting data from the communication control device to the display means, and (v) connecting means for connecting the first conversion means to the entry means, the second conversion means to the data input device, the transmitting means to the display means, and the communication control device to a computer network; (e) at least one system central processing unit remote from the communication control device and in direct communication with the communication control device having (i) at least one installed biometric recognition system, (ii) a first processor means for generating a biometric template from the captured biometric data using the installed biometric recognition system, (iii) a second processor means for comparing and scoring the correspondence of two biometric templates using the installed biometric recognition system; (iv) storage means for storing a set of biometric templates generated by the biometric recognition system in a biometric database, (iv) searching means for searching the biometric database for a stored biometric template linked with an identifying parameter, and (v)communication means for bi-directional communication with the communication control device.

Another aspect of the present invention is an identity verification system, the verification system comprising: (a) a plurality of referenced data input devices wherein each referenced data input device is associated with a data identification code; (b) a plurality of entry means for recording biometric data, wherein each entry means is associated with a biometric identification code; (c) a plurality of display means for displaying information to a system operator; (d) a communication control device remote from the entry means, the data input devices and the display means, said communication control device having (i) receiving means for receiving a set of biometric data from the entry means linked to the biometric identification code and a set of input data from the data input device linked to the data identification code, (ii) a first conversion means for selectably capturing a portion of the set of biometric data received from the entry means and converting said portion of captured biometric data into a compressed digital file of the captured biometric data linked to the biometric identification code, (iii) a second conversion means for formatting the set of input data into a network protocol standard linked to the data identification code, (iv) transmitting means for transmitting data from the communication control device to the display means, and (v) connecting means for connecting the first conversion means to the entry means, the second conversion means to the data input device, the transmitting means to the display means, and the communication control device to a computer network; and (e) at least one system central processing unit remote from the communication control device and in direct communication with the communication control device having (i) an installed biometric recognition system, (ii) a first processor means for generating a biometric template from the captured biometric data using the installed biometric recognition system, (iii) storage means for storing a set of biometric templates generated by the biometric recognition system in a biometric database, (iv) searching means for searching the biometric database for a stored biometric template linked with an identifying parameter, (v) a second processor means for comparing and scoring the correspondence of two biometric templates using the installed biometric recognition system; and (vi) communication means for bi-directional communication with the communication control device.

Yet another aspect of the present invention is an identity verification system, the verification system comprising: (a) a plurality of data input stations, each data input station comprising (i) a referenced data input device associated with a data identification code, (ii) at least one entry means for recording a set of biometric data, wherein each entry means is associated with a biometric identification code, and (iii) a display means associated with the data input device and the entry means; (b) a communication control device remote from said data input stations, said communication control device having (i) receiving means for receiving the set of biometric data linked with the biometric identification code and a set of input data from the data input device linked with the data identification code, (ii) a first conversion means for selectably capturing a portion of the set of biometric data received from the entry means and converting said portion of captured biometric data into a compressed digital file of the captured biometric data linked to the biometric identification code, (iii) a second conversion means for formatting the set of input data into a network protocol standard linked to the data identification code, and (iv) transmitting means for transmitting data from the communication control device to the display means; (c) a plurality of keycatcher units; (d) a plurality of interactive local communication stations, each communication station comprising (i) a local central processing unit, (ii) a keyboard, (iii) a monitor, and (iv) a data input apparatus; and (e) a system central processing unit remote from the communication control device and in direct communication with the communication control device having (i) an installed biometric recognition system, (ii) a first processor means for generating a biometric template from the captured biometric data using the installed biometric recognition system, (iii) a second processor means for comparing and scoring the correspondence of two biometric templates using the installed biometric recognition system; (iv) storage means for storing a set of biometric templates generated by the biometric recognition system in a biometric database, (iv) searching means for searching the biometric database for a stored biometric template linked with an identifying parameter, and (v) communication means for bi-directional communication with the communication control device.

Still yet another aspect of the present invention is an identity verification system, the verification system comprising: (a) a plurality of referenced data input devices wherein each referenced data input device is associated with a data identification code; (b) a plurality of cameras for recording photographic images, wherein each camera is associated with a camera identification code; (c) a display means for displaying information to a system operator; (d) a communication control device remote from the data input devices, the cameras and the display means, said communication control device including (i) a camera server having a video engine in communication with at least one camera, wherein the video engine selectably captures a set of photographic images taken with the camera and converts the images into a compressed digital file linked to the camera identification code, a first data conversion engine in communication with at least one data input device, wherein the first data conversion engine captures a set of input data from the data input device and formats the captured data into a network protocol standard linked to the data identification code, and a second data conversion engine, wherein the second data conversion engine formats a set of output data for communication with the display means; and (ii) a main board that connects the camera server to the camera, the data input device, the display means and a computer network; (e) a plurality of keycatcher units; (f) a plurality of interactive local communication stations, each communication station comprising (i) a local central processing unit, (ii) a keyboard, and (iii) a monitor; and (g) at least one system central processing unit remote from the communication control device and in direct communication with the communication control device having (i) an installed biometric recognition system, (ii) a first processor means for generating a biometric template from the captured biometric data using the installed biometric recognition system, (iii) a second processor means for comparing and scoring the correspondence of two biometric templates using the biometric recognition system; (iv) storage means for storing a set of biometric templates in a biometric database, and (iv) searching means for searching the biometric database for a stored biometric template linked with an identifying parameter.

Another aspect of the present invention is a method for image capture and verification comprising: sending a live video stream of an individual taken with a camera to a communication control device; capturing a photographic frame out of the video stream; converting the photographic frame into a compressed digital file; capturing a set of input data in a common protocol format from at least one data input device; converting the common protocol formatted data into a network standard protocol; sending the compressed digital file and converted input data to a central processing unit for image verification or identification; and providing feedback on the status of the verification process to a visual output device.

Still yet another aspect of the present invention is a method for verifying a user's identity and authorizing a transaction authorization, the method comprising the steps of: entering a user's authorization identifier through a referenced data input device into a communication control device, said communication control device in communication with a CPU; searching a database of authorized users residing on the CPU for the user's authorization identifier, wherein said database of authorized users links a digitized biometric data file previously obtained from each authorized user with each authorized user's authorization identifier; activating a biometric data entry mechanism reference-linked to the referenced data input device; gathering biometric data from the user using the biometric data entry mechanism; capturing selected biometric data with the communication control device and generating a compressed digitized file from the selected biometric data; processing the compressed digitized file of selected biometric data though a biometric recognition system residing on the CPU to form a test biometric data file, wherein the test biometric data file is in a comparable format as the previously obtained biometric file linked with the user's authorization identifier in the authorized user database; comparing the test biometric data file with the previously obtained biometric file linked with the user's authorization identifier in the authorized user database; providing feedback on the result of the comparison of the test biometric data file with the previously obtained biometric file linked with the user's authorization identifier in the authorized user database to a visual output device associated with the biometric data entry mechanism; and authorizing the transaction if a comparison in the test biometric data file and the previously obtained biometric file linked with the user's authorization identifier in the authorized user database is acceptable.

Yet another aspect of the present invention is a face recognition based method for verifying the identity of an individual, the method comprising the steps of: entering an identifier associated with a person through a referenced data input device into a communication control device, said communication control device in communication with a CPU; searching an enrolled face database residing on the CPU for the person's identifier, wherein said enrolled face database links a set of stored digitized facial template files of a number of individuals with a set of identifiers for each of the individuals; activating a camera reference-linked to the referenced data input device; gathering a plurality of photographic images of the person; capturing a set of selected photographic images with the communication control device and generating a set of compressed digitized image files from the selected photographic images; transmitting the compressed digitized image files to the CPU; processing the compressed digitized image files though a face recognition system residing on the CPU to form a test facial template file; comparing the test facial template file with the stored facial template file associated with the person's identifier in the face database; and providing feedback on the correspondence of the test facial template file with the stored facial template file to a visual output device associated with the biometric data entry mechanism.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention relates to a security system that utilizes a biometrics recognition system (including but not limited to a face, fingerprint, hand or iris recognition system) to verify the identification of a person seeking authorization to enter a restricted area or to complete a restricted transaction. The system is described herein with reference to the Figures, in which like elements are referred to by like numerals.

Figure 1:
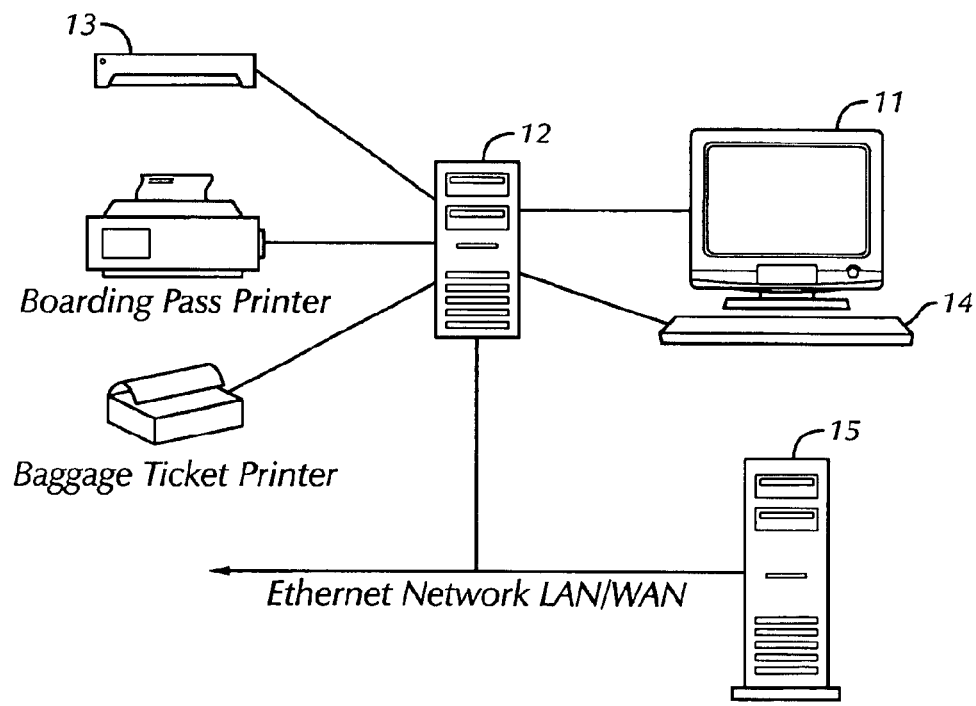
FIG. 1 is a schematic representation of the architecture of a current passenger check-in terminal.
Figure 2:
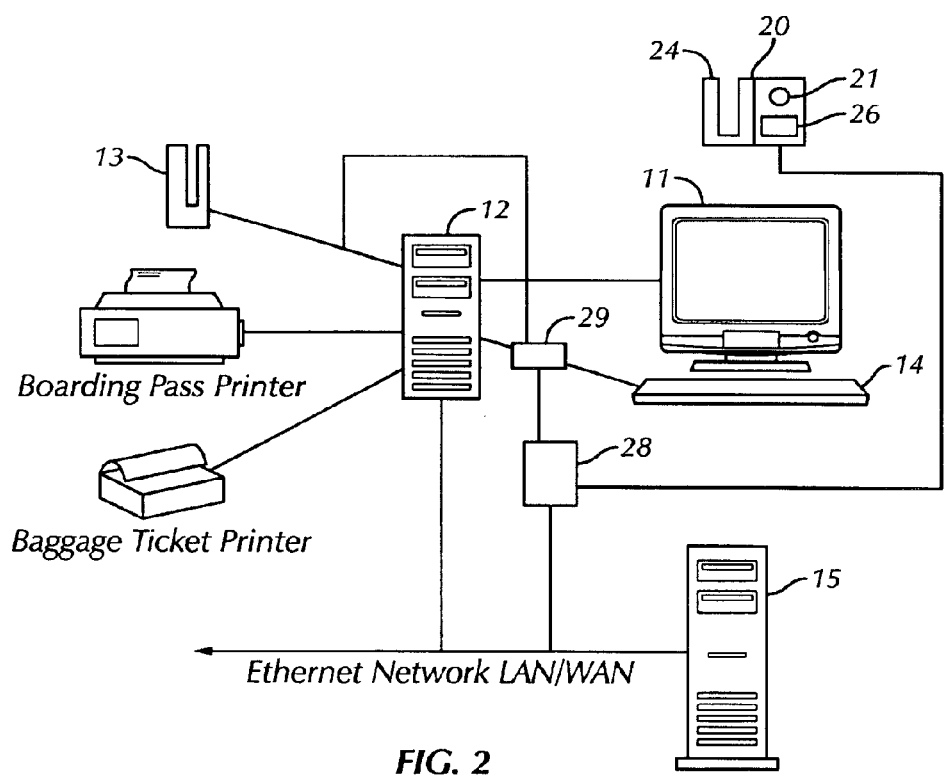
FIG. 2 is a schematic representation of one embodiment of the architecture of an airport verification point where the present invention has been installed.

A general schematic of a preferred embodiment of the present invention is illustrated in FIG. 2. In contrast to current passenger check-in terminals or verification points in sensitive access restricted areas, the present invention incorporates an objective biometric recognition system, such as a face recognition system, linked to one or more personal identifiers such as a passport number, a national identity document, a bank account number, an employee number, or other unique identification numbers.

Each verification point of the Identify Verification System has a data input station 20, a communication control device 28 and a keycatcher 29, as well as optional accessories such as a local computer 12, one or more external data input devices 13, a printer, a monitor and a keyboard. Each verification point communicates with a central processing unit ("CPU") 15 or a server 34 via a TCP/IP protocol or a similar network protocol.

The Data Input Station

The data input station 20, as illustrated in FIG. 2, includes at least one biometric data entry device 21, one or more data input devices 24, and one or more visual output devices 26 such as Liquid Crystal Displays ("LCDs"). The data input station 20 is directly connected to a communication control device 28.

The biometric data entry device is a device that gathers biometric data for analysis. The biometric data entry device 21 may be incorporated into the data input station 20, or it may be separated from the data input station 20. The biometric data entry device 21 may be a camera, a fingerprint scanner, a hand geometry reader, a microphone, an iris scanner or any other biometric scanner. More than one biometric data entry device 21 may be connected to the communication control device 28, such biometric data entry devices 21 may the same type of device or they may be different type of devices. Each biometric data entry device has an identification code associated with it. Whenever the biometric entry device is incorporated into a data input station 20, the identification code will be associated with the biometric data entry device 21, the data input device 24 and the display means or visual output device 26 of the data input station 20.

Figure 4:
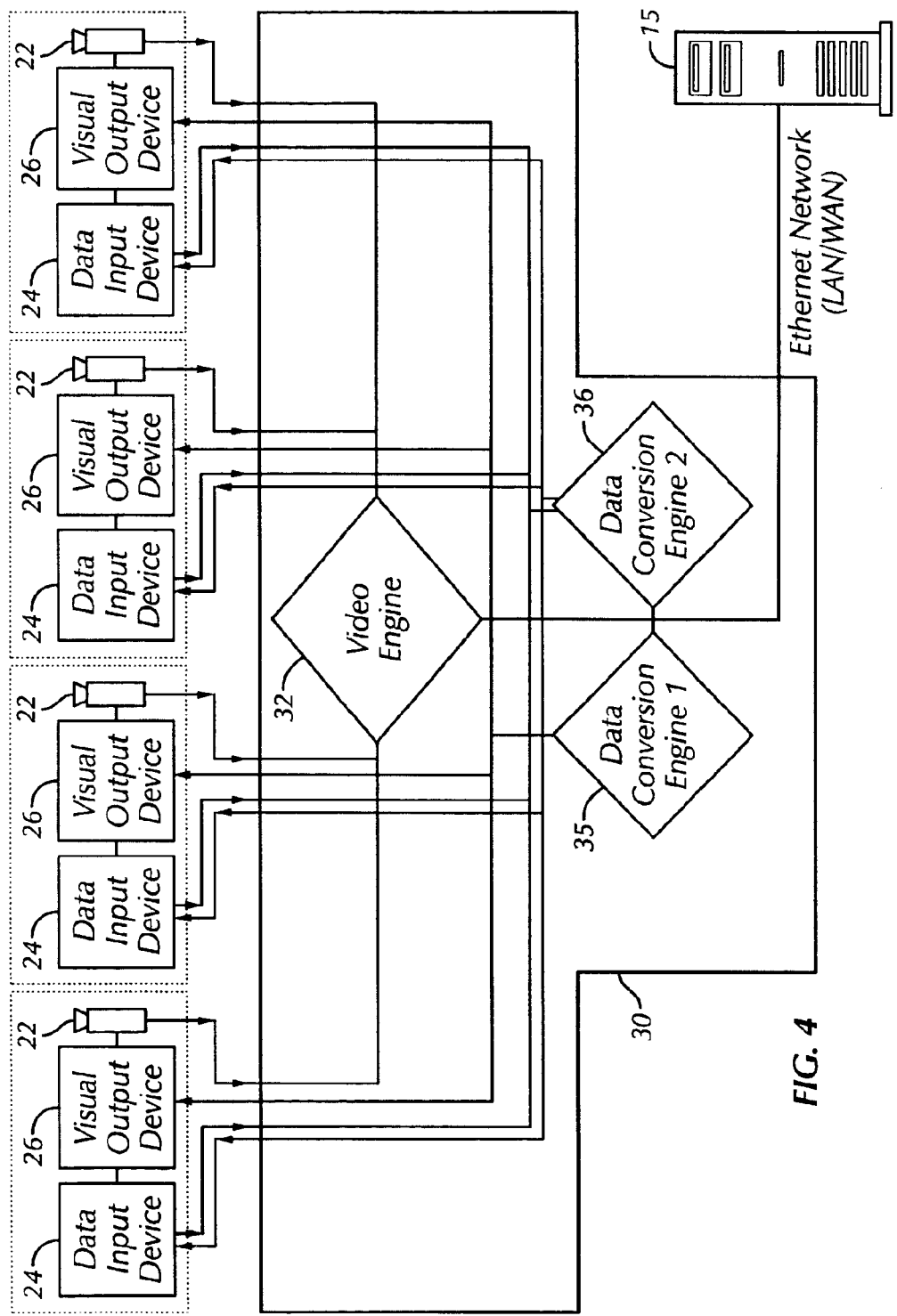
FIG. 4 is a schematic depiction of the camera server device and its interfaces with a camera, a data input device, a data output device and a central processing unit.

The preferred biometric data entry device is a camera 22 as shown in FIG. 4. The camera 22 (NTSC/PAL) may be a low light level camera or any other suitable camera. Either analogue or digital cameras are suitable and many suitable cameras and lenses for this application are commercially available. For example, the camera 22 may be a color camera such as a SONY SSC-CX34P or a JVC TK-C1380E.

One embodiment of the present invention has two cameras 22, where one camera 22 is mounted to photograph the system operator and the other camera 22 is mounted to photograph the passenger or customer seeking authorization to complete a transaction. The cameras are therefore most often mounted so as to point in opposing directions where the operator is positioned to face the passenger or customer when performing the transaction.

The data input station 20 will typically have a display means for displaying information to a system operator, hereinafter referred to as a visual output device 26. A preferred embodiment of the visual output device 26 is a LCD. Preferably, a visual output device 26 is associated with each biometric data entry device and/or data input device 24. The visual output devices 26 are used to communicate the progress of the verification process to the system operator and/or to provide instructions for the system operator. A system operator being defined herein as a person operating the Identity Verification System or any portion thereof. The system operator includes without limitation any person entering data into the Identity Verification System such as security employees, employees responsible for verifying the identity of a person or a person desiring to complete a transaction.

The data input station 20 will also include at least one data input device 24. The data input device 24 may be any type of data input or data capture device, such as a magnetic card swipe reader, proximity sensor, check reader, barcode scanner, smart card reader, passport scanner, barcode scanner or even a biometrics input device such as a fingerprint scanner, hand geometry reader or microphone. Such devices are commercially available and are well known to one skilled in the art. One example of a usable magnetic strip reader is an Elk Card Reader, model number A10190 that is commercially available from Brush Industries, Sunbury, Pa.

Different data input devices 24 may be available at a verification point as drop-in replacements for one another. The particular data input device 24 that is chosen for a particular application is dependent upon the type of identification document most likely to be presented by passengers or customers. At international airport security stations, passengers are most likely to present a passport as identification and the preferred data input device 24 is a document scanner such as those commercially available from a number of sources. As a further alternative, a combination of multiple data input devices might be available in a data input station 20.

Each data input device 24 has an identification code associated with it. Whenever the data input device 24 is incorporated into a data input station 20, the identification code will be associated with the biometric data entry device 21, the data input device 24 and the display means or visual output device 26 of the data input station 20. External data input devices 13 will also typically have an identification code associated with it.

The Communication Control Device

The communication control device 28 comprises: (a) a receiving means for receiving the biometric data from the biometric data entry device and a set of input data from the data input device; (b) a first conversion means for selectably capturing a portion of the biometric data received and converting the captured biometric data into a compressed digital file; (c) a second conversion means for formatting the set of input data into a network standard protocol; (d) a transmitting means for transmitting data from the communication control device to the display means or visual output device; and (e) a connecting means for connecting the first conversion means to the biometric data entry device, the second conversion means to the data input device, the transmitting means to the visual output device, and the communication control device to a computer network.

Preferably the communication control device 28 has an Ethernet camera or video server device 30, such as is commercially available from Axis Communications of Lund, Sweden and an interconnecting main board 38, as is commercially available from BioCom, LLC of Houston, Tex. The particular camera server device 30, shown in FIG. 3, includes four composite video inputs, two RS232 input connectors and one RS485 input connector. The camera server device 30 is used in the present invention in cooperation with hardware that performs connecting functions and protocol conversion functions, as well as power distribution functions.

The interconnecting main board 38 within the communication control device 28 is used to connect the data input station 20 with its data input devices 24, visual output devices 26 and biometric data entry devices 21 to the camera server device 30 residing within communication control device 20. The main board 38 will also have optional connectors that connect to external cameras, visual output devices (such as LCDs) and external data input devices 13 (such as a passport or document scanners, card swipe units, proximity sensors, or barcode scanners). In addition, the main board 38 has connectors that connect the camera server device 30 to either a new or existing Ethernet based network.

Figure 3:
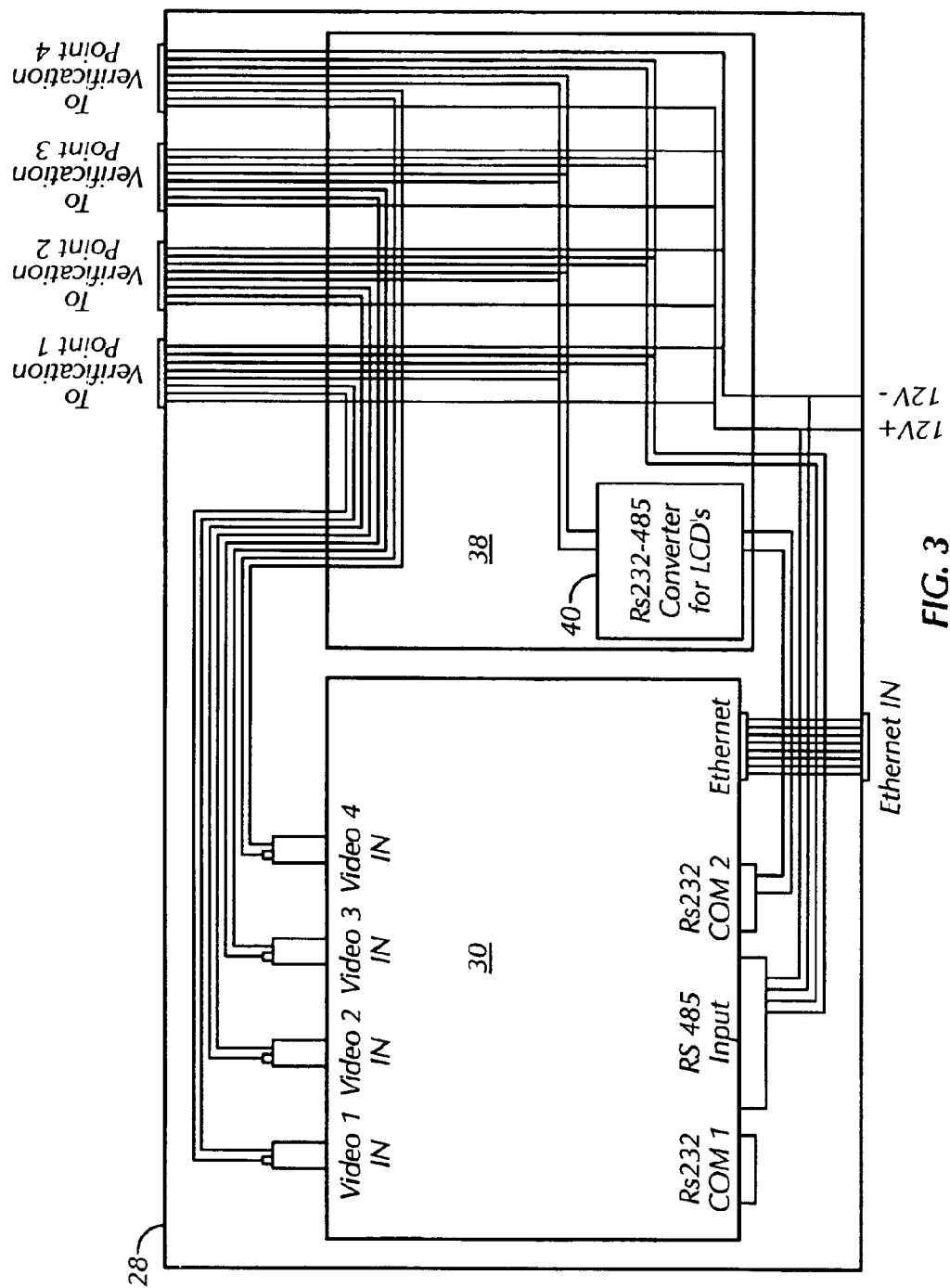
FIG. 3 is a schematic depiction of the communication control device of the present invention.

The main board 38 also has circuitry that converts the RS485 data from the visual output device 26 to RS232 data. This is performed in the example shown because the internally mounted camera server device 30, shown in FIG. 3, is only capable of handling one stream of RS485 data and this stream is used for the data input device 24. The visual output device 26 also uses a RS485 protocol and must be converted to an RS232 protocol so that it can be connected to the RS232 input port on the internal camera server 30. The RS232–485 converter 40 on the main board 38 performs this conversion function.

The camera server device 30 is also used to bi-directionally communicate common protocols such as RS232 or RS485 protocols over a new or existing computer network using a TCP/IP, HTTP, UDP, ARP or similar network protocol. This allows for data input devices such as magnetic stripe card readers, proximity readers, barcode scanners, document scanners or similar devices to be incorporated into the data input station 20, or for external data input devices 13 to be interfaced directly into the camera server device 30. The camera server device 30 also communicates such protocols to visual output devices 26 to provide interactive feedback on the status and/or outcome of the verification process to the system operator.

FIG. 4 illustrates how the camera server device 30 interfaces with an analogue or digital camera 22, a data input device 24 and a visual output device 26 of the data input station 20. Three main engines/functions handle incoming and outgoing video and data feeds. The video engine 32 performs the image capture, compression and/or digitization of the images from the live video feed. The data protocol conversion engines 35 and 36 perform the conversions of the common protocols to a standard network protocol, such as a TCP/IP, HTTP, UDP or ARP protocol. For example in FIG. 4, the first data conversion engine 35 handles the protocol conversions associated with the visual output devices 26 and the second data conversion engine 36 handles the protocol conversions associated with the data input devices 24. FIG. 4 further illustrates how the camera server device 30 is interfaced to the CPU 15 via a new or existing Ethernet network.

Figure 6:
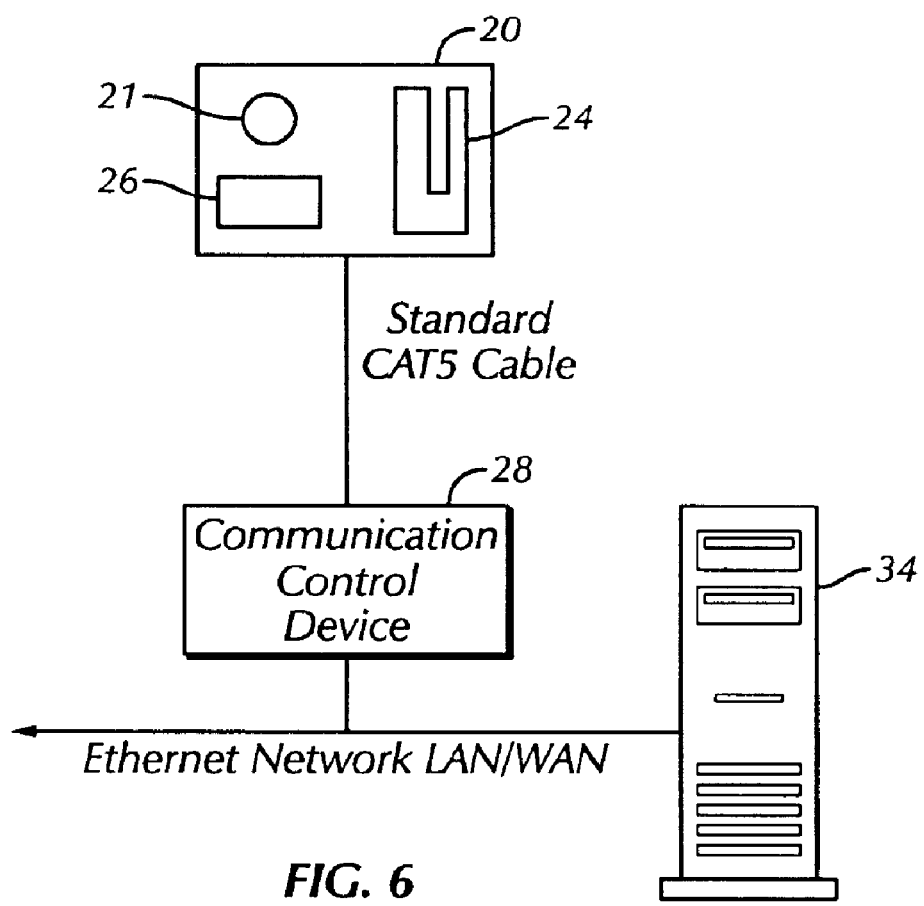
FIG. 6 illustrates the connection between the data input station, the communication control device and a central processing server.

FIG. 6 is a schematic illustration of how the communication control device 28 communicates with the input data station 20. The input data station 20, with its biometric data entry device 21, the data input device 24 and the visual output device 26, communicates with the communication control device 28 through a standard CAT5, CAT6 or similar cable with RJ45 or similar connectors on either end from the communicator control device 28. The communication control device 28 can capture, compress, digitize, and encrypt the photographic images from each camera 22, or other biometric data entry device, connected to the communication control device 28. The communication control device then communicates the processed or compressed images through a TCP/IP protocol or other standard network protocol to a CPU 15 or a server 34 for further processing.

The communication control device 28 communicates common protocols such as RS232 or RS485 protocols with data input devices 24, a keycatcher 29, and bi-directionally communicates with visual output devices 26 to provide interactive feedback on the status and/or outcome of the Identity Verification System to the system operator. The communication control device 28 communicates with a keycatcher 29 such that the transaction occurring at the verification point may be terminated and the local computer 12 locked whenever a discrepancy is found in the individual seeking admittance and the individual's associated identifiers. Whenever such a discrepancy occurs, an alarm may sound or a radio frequency transmitter may be activated to bring additional personnel and oversight to the verification point. To overcome the interruption in the transaction, a controlled manual verification and/or override process may be required.

Additional data input devices 13 that are not incorporated into the data input station 20 may also be connected to the communication control device 28. The communication control device 28 captures the data and translates the data to a TCP/IP, HTTP, UDP, ARP or similar network protocol that is sent to at least one CPU 15 or server 34. Furthermore, the communication control device 28 communicates with the visual output device 26 and the keycatcher 29 to provide interactive feedback on the status or outcome of the Identity Verification System to the operator of the system and to facilitate communications with additional input devices 13.

The communication control device 28 is easy to operate and the system operator does not require extensive training to successfully utilize the system. The communication control device 28 receives a live video stream of images of an individual taken with an analogue or digital camera 22 and feeds these live video streams into the internally mounted camera server device 30. The camera server device 30 then captures selected photographic frames of the individual out of the video stream and stores these frames in a memory buffer. The camera server device 30 then converts each photographic frame into a compressed digital file, such as a JPEG, MPEG, Bitmap or Wavelet file.

The system processor that resides on the CPU 15 or the server 34 requests the images that are stored in the buffer memory whenever it requires them, such as when the system receives a request for a verification or enrollment from the software system via one of the common data input devices. Whenever requested by the central processing server 34, the camera server device 30 sends the compressed digital files to the requesting central processing server 34 via a TCP/IP protocol or similar network protocol for further processing.

The Keycatcher

Figure 5:
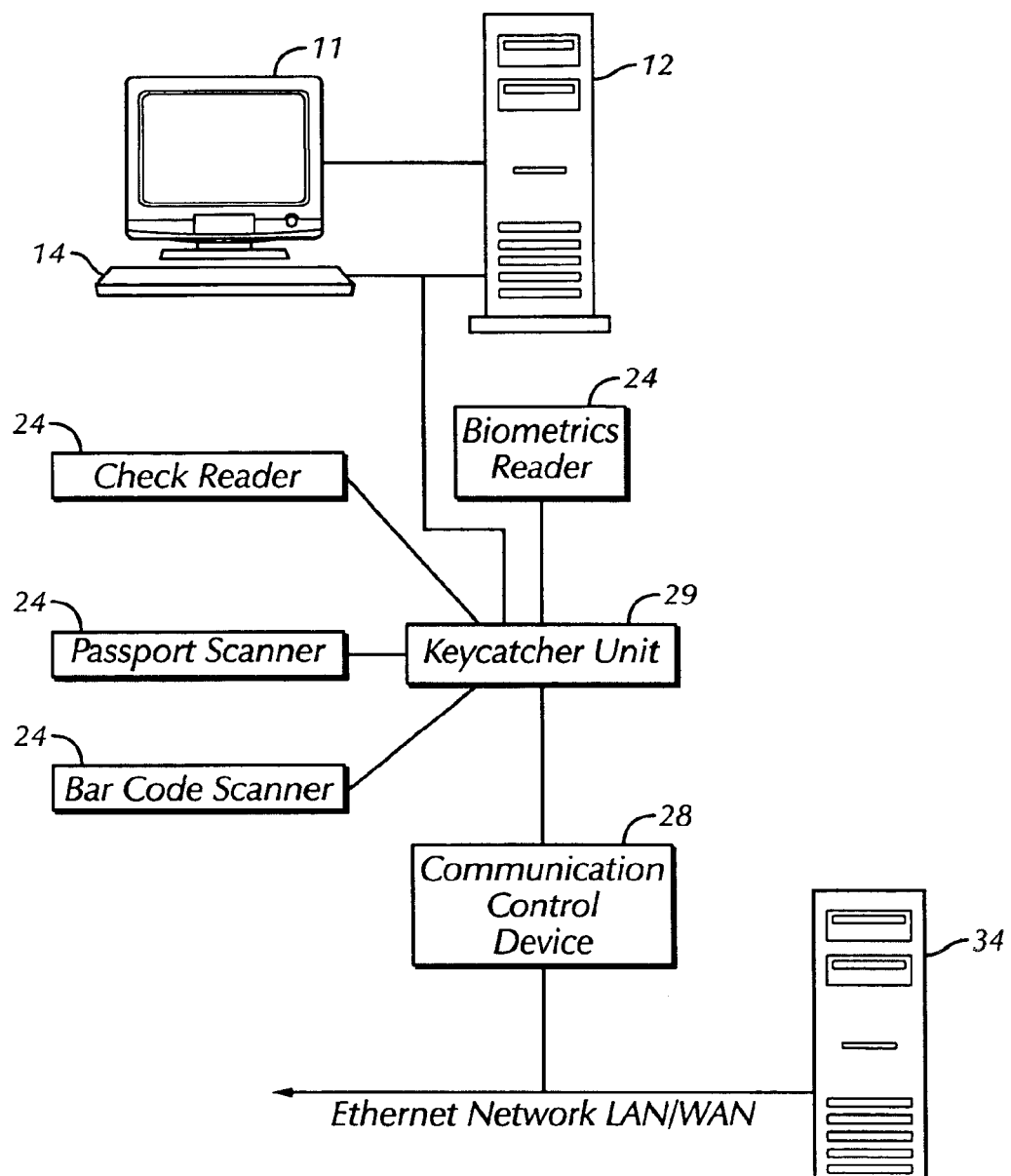
FIG. 5 is a schematic representation of the keycatcher unit and the relevant devices connected thereto.

The keycatcher 29 is a device designed to monitor and capture data from any number of RS485 or RS232 devices. The keycatcher 29 monitors the RS485 or RS232 data flowing from a data input device 13 such as a passport or document scanner, card swipe unit, proximity sensor barcode scanner or, most importantly, a keyboard 14 as illustrated in FIG. 5. The keycatcher 29 has both inputs and outputs allowing the original data to flow from the data input device 24 to the computer to which that data input device was originally attached through the keycatcher 29.

The keycatcher 29 is interfaced into the communication control device 28 on one side and has a number of data input ports on the other side. The data input devices 24 are connected to the data input ports on the keycatcher 29, as shown in FIG. 5. The keycatcher 29 is equipped with Flash and RAM memory that allows it to be programmed to "listen" for a specific data sequence or series flowing from the data input devices 24 to the local computer 12 to which the keycatcher 29 is connected. This programming is sent to the keycatcher 29 via software, which is part of the face recognition software that resides on the central processor 34. The keycatcher will continually "listen" to all the data that flows through from the data input device 24 to the local computer 12 to which the data input device 24 is connected. If and when the keycatcher 29 encounters a pre-programmed string or series within that data, the keycatcher will perform the necessary function. This function is programmed into the memory within the keycatcher 29 by the same software that is used to program the "listen" mode for the data series or sequence.

As an example, the keycatcher could be programmed to listen for an instance where the "F3" button on a keyboard is pressed. The action of pressing the "F3" button on a keyboard could represent the first step in the process whereby the operator at an airport check-in terminal starts to manually enter the passport number on a keyboard. The keycatcher will be programmed to recognize that the "F3" button will be the first step in the process and that it will precede a number. The keycatcher will then be programmed to transmit the data immediately following the "F3" button to the biometric recognition software residing on the CPU 15 or server 34. This data can then be used to link the biometric data of the passport holder to that passport number that has now been captured by the system. The main advantage of the keycatcher 29 is that it allows for data to be gathered from a keyboard, or almost any RS485 or RS232 device, and to be used in a biometric recognition system (e.g., a face recognition system including a process for face recognition comparison and/or face finding and/or template creation/matching) without the need for interfacing on a software level between the biometric recognition system and the existing transaction system (e.g., the ticketing system in an airport or a front counter device in a bank). This enables the two systems to remain completely independent and will eliminate the risk of malfunctioning that is inherent when systems need to be integrated on a software level. This allows the independent systems to be linked or integrated on a pure hardware level. This level of integration is very fast and requires no special skills from software engineers.

The keycatcher device 29 is also capable of disrupting the flow of data from the data input device 24 to the local computer 12 to which that device is connected. This is especially useful when the biometric recognition system denies the verification of a person. The keycatcher unit 29 can then be instructed by the system software to disrupt the flow of data between the data input device 24 and the local computer 12 to which it is attached, thereby effectively preventing the operator from continuing with the transaction. An override process may then be required in order to continue with the transaction.

The override process varies depending on the application and is again configurable from the biometric recognition software residing on the central processing unit 15 or server 34. The process would typically require the operator to initiate an override process by pushing a "trigger" key or key sequence on the keyboard 14. This could be any key, such as "F3", or any number of keys in a specific sequence (e.g., "F3", "P", "Enter" followed by a relevant password). The keycatcher 29 would then feed this data to the face recognition software residing on the server 34. Should the software approve the password, the system software will instruct the keycatcher 29 to allow data to pass through to the local computer 12, the CPU 15 or the server 34 again so that the transaction may continue. The password override process will be logged and recorded by the system software for later audit review.

Multiple Interconnected Verification Points

Figure 7:
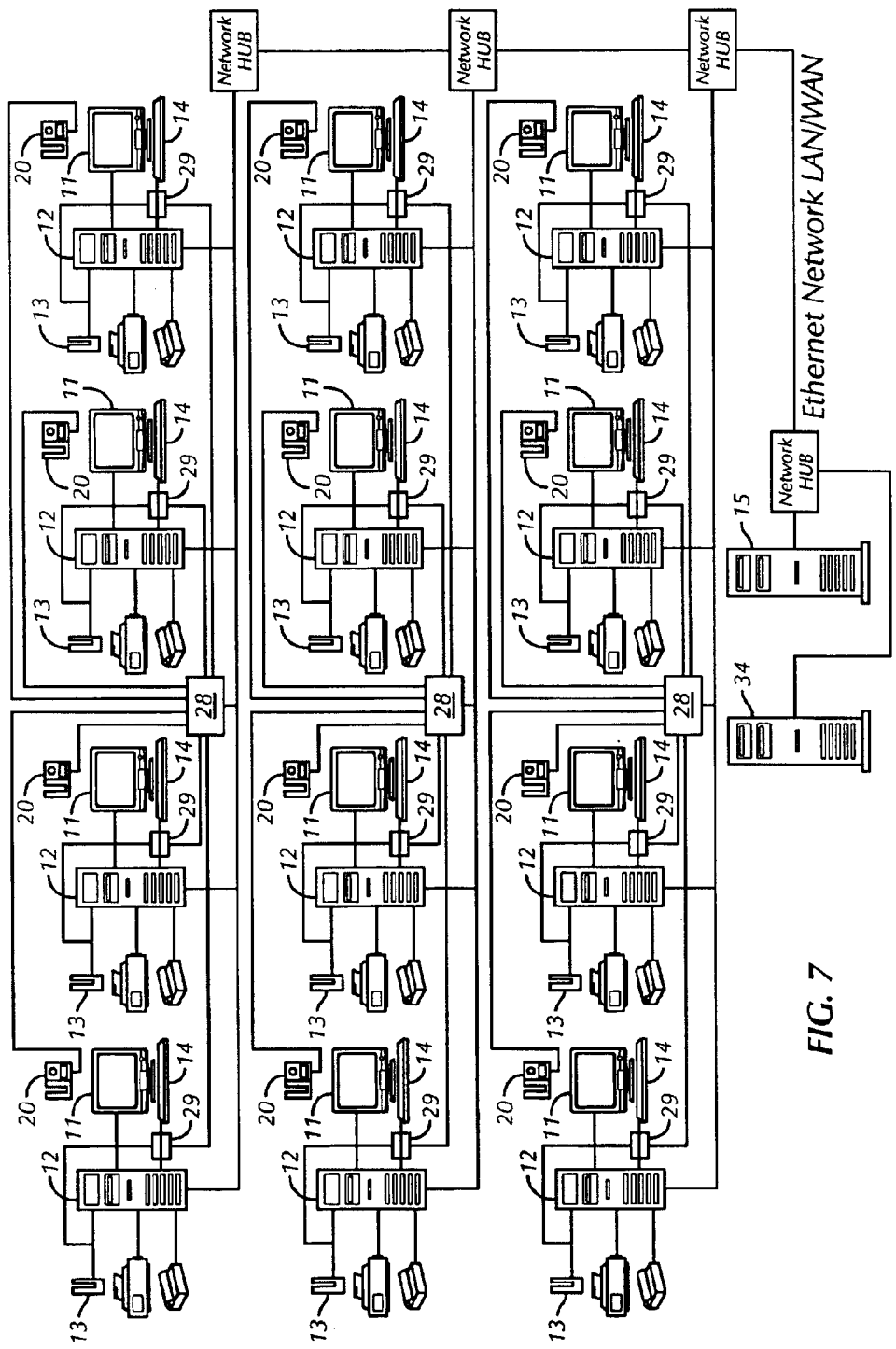
FIG. 7 is a schematic depiction of a plurality of cameras, data input devices and visual output devices connected to the communication control device that is connected to a processing computer.

One or more verification points, but preferably no more than four verification points, communicate with the communication control device 28. Furthermore, one or more communication control devices 28 may be interconnected as shown in FIG. 7. The data captured from the data input stations 20 by the communication control devices 28 is fed into one or more CPUs 15 and/or servers 34 through a network hub, such as an Ethernet hub.

The communication control device 28 can communicate with a number of verification points, preferably from one to four verification points. The communication control device 28 may or may not reside in close proximity to the central processing server 34. The distance between the communication control device 28 and the server 34 is limited by the architecture of the communication network between the communication control device 28 and the server 34. For example, the communication control device 28 may plug directly into an existing Ethernet network. A complete system requires at least one verification point linked to one communication control device 28 with at least one central processing server 34.

An unlimited number of verification points can be linked to a single central processing server 34 with the maximum number of verification points being determined by the frequency of verifications requested, the speed of the processor in the central processing server 34, the number of verifications required per verification attempt and the amount of data that must be input into the central processing server 34. Thus, one verification point or multiple verification points may be connected to a single CPU. The communication control device 28 is designed as the central communication interface for the present invention.

The Identity Verification Process

The following describes the process of events occurring in the identity verification system.

A. Enrollment

Since the preferred invention relates generally to identity verification, the invention requires the pre-enrollment of individuals so that their identity can later be established. This enrollment process will occur regardless of the nature of the application of the preferred invention. The enrollment process will entail an individual first proving his or her identity. This process will vary depending on the application but will, in general entail the enrollment officer or operator requesting some positive form of identification having a photographic image of the person attached to the identification document. Once the operator is satisfied that the individual is the person identified by the identification document, the operator will proceed to enroll the individual onto the system. The individual must be linked to some unique identifier. This identifier could take the form of a password that the individual remembers, a token that the individual owns, or a document that the individual owns. Examples would be credit cards, checks, passports, access control tags, RFID tags, driver's license, national identity document, etc.

At the time of enrollment, this unique number must be entered into the system. The manner by which the data is entered would depend on the application. In the case of a credit card for instance, the card could be swiped on a magnetic stripe card reader attached to the enrollment terminal computer or it may be attached to the verification point. It should be noted that the individual could be linked to more than one token or identifying number in a single enrollment. The individual may wish to perform a single enrollment linking him/her to all their checks, credit cards and ATM cards. In this case, all the numbers will be entered into the enrollment application prior to commencing with the enrollment. Once the data is entered into the enrollment application, the application will request the operator to enroll the individual.

The operator has the option to state whether or not the individual is wearing spectacles. If the individual is wearing spectacles, he/she will be requested to remove the spectacles once the image capture portion of the enrollment process has reached its halfway point. This will ensure that the enrollment system has images of the individual with and without spectacles. The individual will be requested to stand facing the camera that is connected to the enrollment point. It should be noted that the camera and data input/output devices that are used for enrollment could also be the same cameras and devices that are used for verification.

Figure 8:
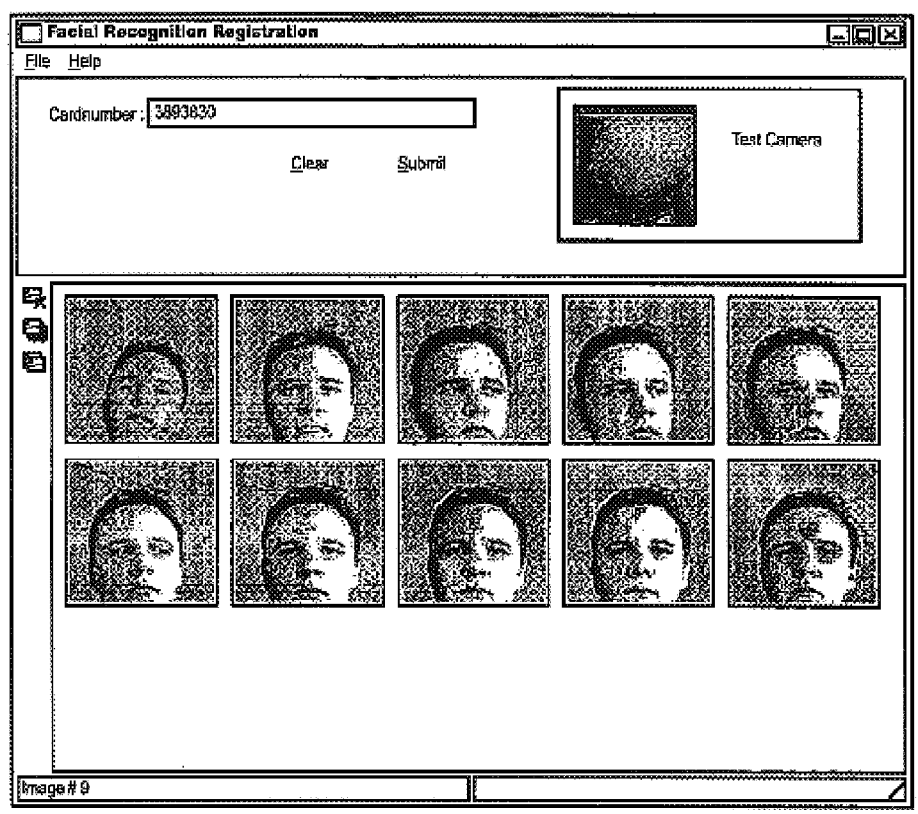
FIG. 8 illustrates one embodiment of an enrollment application according to the present invention.

The camera will send a video stream of facial images of the individual in the field of view to the communication control device 28. The communication control device 28 will continually capture frames out of this video stream and convert those frames to digital JPEG, MPEG, Bitmap, Wavelet or similar files, storing those files in a memory buffer. When the enrollment application requests images, the images from the desired camera 22 (soft configurable on the enrollment application using the IP address of the camera server 30 to which the camera 22 is connected and an identifying camera number on that camera server device 30) are sent to the central processing server 34 and then may be displayed to the enrollment operator on a computer monitor. An example of a display of enrollment images is shown in FIG. 8. It should be noted that this is not always the case since the enrollment application may not always be visible at the enrollment point, especially if no computer monitor is present. In the absence of a monitor, feedback on the progress of the enrollment is given to the operator via an LCD device. Typically however, a separate enrollment computer is connected to the Ethernet network on which the communication control devices 28 and the central processing servers 34 reside and enrollment occurs at a limited number of central points dedicated to the enrollment process.

Once the images have been displayed (if applicable) then the enrollment operator will choose to accept the images or to replace selected poor quality images. Once the operator is satisfied with the images and the required number of images has been captured (soft configurable, typically between 4 and 20 images) then the operator will choose to continue and the images will be passed by the system software to the face recognition algorithm engine where the images will be converted into templates. The templates, together with the unique identifiers are stored in the central database on the central processing server 34. It should be noted that although an entire installation of the present invention may encompass a large number of central processing servers 34 for the processing of data and face recognition comparisons, the local central database will typically only reside on one or a maximum of two of those central processing servers 34.

Directly after enrollment, the individual will be requested to verify his/her identity to ensure that the enrollment was successful. This verification follows the same process as described under "verification" below. The registration application will also allow an administrator to update the image templates of the individual should the need arise. In this case, prior to allowing the administrator to see the images of the individual that wishes to change their identity, a verification will be conducted on the individual that is standing in front of the camera. If the verification is unsuccessful, then the administrator is required to enter a password to view and change the images. In all cases, all but one of the original image templates may be erased and updated.

B. Template Storage

The image templates, together with the unique identifiers are stored in the central database and may be stored in an encrypted format. The template images and unique identifiers together are referred to as an F.I.D. (Face Identification) file. The F.I.D. files may be shared between databases at remote locations using any common data communications medium, including the Internet. This will allow the individual to perform a verification at a different location to that location where the individual enrolled originally.

C. Verification

A verification is initiated when data is entered into the invention through any of the data entry points. The data input devices 24, as described earlier in this document will send data to the central processing servers 34 either through direct connection with those servers or through the communication control device 28. The keycatcher 29 may also be interfaced into the communication control device 28 to facilitate data flow for some data input devices 24.

Figure 9:
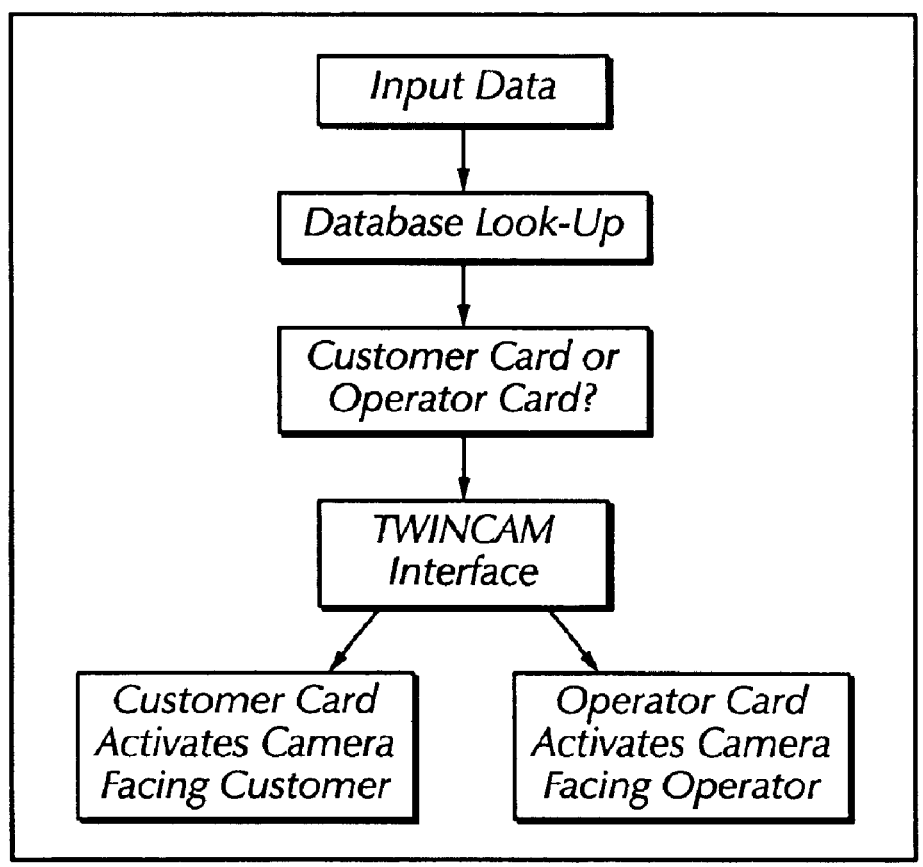
FIG. 9 is a flow chart of the camera switching process.

When the central processing server 34 receives data from a data input device 24, that data, together with the unique identifying number or identifier of that specific data input device 24 is sent to the central database where a search is conducted to determine whether or not a record of that identifier exists on the database. If the identifier is present on the database then the system recognizes that an individual has previously enrolled. The system will further determine whether or not the number record meets the "exception requirement." The "exception requirement" is soft configurable refers to either a prefix or suffix to the number record or to the number of digits in the number record. This is useful when the system is configured to use the two camera system, or the "twincam" system. As shown in FIG. 9, if the number record meets with the "exception requirement" (e.g. the number of digits is less than 5 for operator cards) then the system will send a command to the communicator control device 28 and the camera facing the operator at the verification point will be activated and images of the operator will be sent to the central processing server 34 for verification. Conversely, if the number record does not meet the exception requirement (e.g., a passport number or credit card number having more than 5 digits) then the camera facing the individual is activated.

Figure 10:
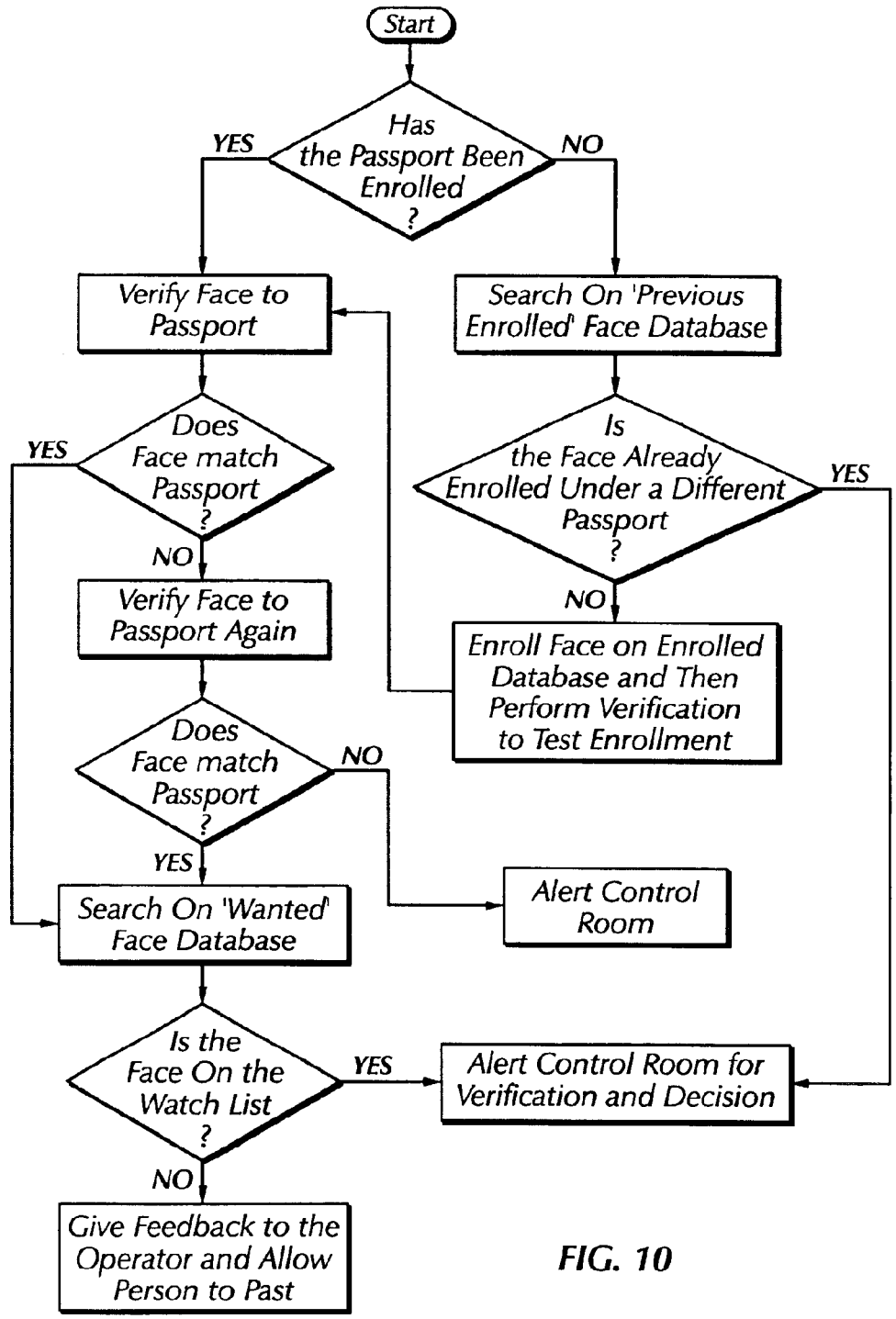
FIG. 10 is a flow chart of the passenger verification process.

FIG. 10 outlines the verification process for an airline passenger. The verification process is initiated by scanning in the passenger's passport. The database on the central processing server 34 is searched for the passenger's facial template in association with at least one identifier for the passenger (e.g., name or passport number). If the passenger has previously been enrolled in the face recognition system, the system will automatically begin with the verification process.

The system will request the required number of images (soft configurable in the configuration application on each central processing server 34) from the communication control device 28 and the individual camera 22 that is linked to the specific data input device 24 where the initiating data originated (i.e., where the passenger's passport was scanned). The camera 22, data input device 24 and LCD 26 are preferably bundled in a data input station 20 and are linked with a unique identifying number. Alternatively, each device is given its own unique identifying number and linked together in the systems configuration application.

Facial images of the individual wishing to verify are obtained, compressed and digitized. The digitized images are sent to the system and immediately converted to templates by a face recognition algorithm engine, such as the face recognition algorithm licensed by Visionics Corporation, Jersey City, N.J. and described in U.S. Pat. No. 6,111,517. At about the same time, the stored templates that were originally linked to the passenger's identifiers upon enrollment are extracted and compared with the newly created template images by the face recognition algorithm engine. The face recognition algorithm engine will score the similarity of the template images determined during the relevant verification attempts by the system. The system will determine whether the scores are above or below the set threshold (soft configurable in the system configuration application). Should the scores from the required number of attempts, as configured in the configuration application exceed the set threshold scores, the verification is considered successful. Should the scores from the required number of attempts, as configured in the configuration application not exceed the set threshold scores, the verification is considered to have failed and security or the control room is alerted. In both scenarios, a message displaying whether the verification has succeeded or failed will be displayed to system operator on the LCD that is linked to and mounted at the verification point where the original request occurred.

If, on the other hand, the passenger has not been previously enrolled into the face database, the system operator is requested to enroll the passenger in the database as previously described.

D. Identification of Undesirables

In some instances, a need may arise to attempt to determine whether or not the person wishing to enroll or verify is on a "watch list" database. This is typically a different database than the database used for verification purposes as illustrated in FIG. 10. In this scenario, the type of match is known as an identification search and the face of the individual is compared to every single face record on the "watch list" database. For example, in an airport environment, persons first enrolling their passport or being linked to a boarding pass, may have their faces searched against a "watch list" of known terrorists or wanted criminals.

Whenever a passenger's face closely matches the face of a suspected terrorist or criminal, a silent alert will notify the security personnel in the security office and the images of the two faces (the face already on the watch list and the face of the person being compared) will be presented to the security officer for manual verification. Appropriate action (either an override or other action) can then be taken by the security officer.

If the passenger's facial template does not match or closely resemble any person on the "watch list," the system operator is notified and the passenger is allowed to pass.

E. Reporting

Each and every verification attempt on the system is logged and recorded by the reporting application. Reports can be generated upon request by a system administrator or automatically by the system at the preset time each day. The reports are visually based and come in both a "successful verification" and "failed verification" format. In each report, the time and date of verification is displayed together with two images. The first image is of the face that was linked to the identifying number upon enrollment. The second is of the face that attempted the verification. In all cases of the "successful verifications" report, the faces of the original enrollee and the face of the individual verifying should be the same. In all cases of the "failed verifications" report, the faces of the original enrollee and the face of the individual verifying should be different. In the "successful verifications" log, if the faces of the two individuals differ, then the threshold is set too low and an individual has managed to "spoof" the system and verify under someone else's identity. This is called a "False Accept." Conversely, in the "failed verifications" log, if the faces of the two individuals are the same, then the threshold is set too high and an individual has incorrectly rejected the correct owner of the identity. This is called a "False Reject"

F. Password Control

An authorized system operator controls all the registration, password management, configuration and reporting applications. Upon arrival at work, the system operator will verify that he/she is an authorized system operator. Basically the operator undergoes an identity verification process like that described above for a customer or passenger. The operator's authorized employee number is entered into the data input device. The employee database is searched and the facial template associated with the employee's authorized employee number stored is identified. The camera is activated and a series of photographic images of the employee are taken and transmitted to the communication control device 28. The communication control device selectably captures certain images and generates a compressed digital image file. The compressed digital image file is sent to the CPU 15 where it is processed by the facial recognition software residing on the CPU to create a facial template. The generated facial template is then compared with the facial template stored in the employee database associated with the employee's authorized employee number. If the generated template and the stored template correspond to each other the employee can sign in and begin work.

While the foregoing description includes detail which will enable those skilled in the art to practice the invention it should be recognized that the description is illustrative in nature and that the invention is not limited in its application to the details of construction and the arrangement of components set forth in the description or illustrated in the drawings. The invention is capable of many modifications and variations that will be apparent to those skilled in the art having the benefit of these teachings. Also, it is to be understood that the phraseology and terminology employed herein is for the purposes of description and should not be regarded as limiting.

What is claimed is:

1. An identity verification system, the verification system comprising:

(a) entry means for recording biometric data;

(b) a data input device;

(c) display means for displaying information to a system operator;

(d) a communication control device remote from said entry means, data input device and display means, said communication control device having
  (i) receiving means for receiving a set of biometric data from the entry means and a set of input data from the data input device,
  (ii) a first conversion means for selectably capturing a portion of the set of biometric data received from the entry means and converting said portion of captured biometric data into a compressed digital file of the captured biometric data,
  (iii) a second conversion means for formatting the set of input data into a network protocol standard,
  (iv) transmitting means for transmitting data from the communication control device to the display means, and
  (v) connecting means for connecting the first conversion means to the entry means, the second conversion means to the data input device, the transmitting means to the display means, and the communication control device to a computer network;

(e) a system central processing unit remote from the communication control device and in direct communication with the communication control device having (i) an installed biometric recognition system,
(ii) a first processor means for generating a biometric template from the captured biometric data using the installed biometric recognition system,
(iii) a second processor means for comparing and scoring the correspondence of two biometric templates using the installed biometric recognition system;
(iv) storage means for storing a set of biometric templates generated by the biometric recognition system in a biometric database,
(iv) searching means for searching the biometric database for a stored biometric template linked with an identifying parameter, and
(vi) communication means for bi-directional communication with the communication control device.

2. The identity verification system of claim 1, wherein the entry means is a camera.

3. The identity verification system of claim 2 having a plurality of cameras.

4. The identity verification system of claim 2, wherein first conversion means converts the portion of captured biometric data into a set of JPEG image formatted files.

5. The identity verification system of claim 1, wherein the entry means is a camera, a fingerprint scanner, a hand geometry reader, a microphone, or an iris scanner.

6. The identity verification system of claim 1 having a plurality of entry means.

7. The identity verification system of claim 1, wherein the data input device is a digital reading device that reads and transmits digital data recorded on a customer identification mechanism.

8. The identity verification system of claim 7, wherein the customer identification mechanism is a passport, a credit card, a bankcard, an authorized employee card, or an authorized entry token.

9. The identity verification system of claim 1 having a plurality of data input devices.

10. The identity verification system of claim 1, wherein the display means is a liquid crystal display, a monitor, or a status indicator.

11. The identity verification system of claim 1, wherein the network protocol standard is a TCP/IP, HTTP, UDP, or ARP protocol standard.

12. The identity verification system of claim 1, wherein the installed biometric recognition system is a face recognition system.

13. The identity verification system of claim 1, wherein the system central processing unit is in direct communication with a plurality of communication control devices.

14. The identity verification system of claim 1, wherein the entry means, the data input device and the display means are incorporated into a data input station, the data input station in direct communication with the communication control device.

15. The identity verification system of claim 14, wherein the entry means is a camera.

16. The identity verification system of claim 15, wherein the data input station has two cameras mounted in opposed directions.

17. The identity verification system of claim 14, wherein a plurality of the data input stations are in direct communication with the communication control device.

18. The identity verification system of claim 1, further comprising a keycatcher in direct communication with the communication control device.

19. The identity verification system of claim 18, wherein the keycatcher is in direct communication with a local CPU and a keyboard.

20. The communication control device of claim 1, wherein the entry means is linked to a first identification code, said first identification code linked to the compressed digital file of the captured biometric data originating from the entry means, and wherein the data input device is linked to a second identification code, the set of input data linked to the formatted input data.

21. The communication control device of claim 20, wherein the set of input data is referenced to the compressed digital file of the captured biometric data.

22. An identity verification system, the verification system comprising:
(a) a plurality of referenced data input devices wherein each referenced data input device is associated with a data identification code;
(b) a plurality of entry means for recording biometric data, wherein each entry means is associated with a biometric identification code;
(c) a plurality of display means for displaying information to a system operator;
(d) a communication control device remote from the entry means, the data input devices and the display means, said communication control device having
(i) receiving means for receiving a set of biometric data from the entry means linked to the biometric identification code and a set of input data from the data input device linked to the data identification code,
(ii) a first conversion means for selectably capturing a portion of the set of biometric data received from the entry means and converting said portion of captured biometric data into a compressed digital file of the captured biometric data linked to the biometric identification code,
(iii) a second conversion means for formatting the set of input data into a network protocol standard linked to the data identification code,
(iv) transmitting means for transmitting data from the communication control device to the display means, and
(v) connecting means for connecting the first conversion means to the entry means, the second conversion means to the data input device, the transmitting means to the display means, and the communication control device to a computer network; and
(e) at least one system central processing unit remote from the communication control device and in direct communication with the communication control device having
(i) an installed biometric recognition system,
(ii) a first processor means for generating a biometric template from the captured biometric data using the installed biometric recognition system,
(iii) storage means for storing a set of biometric templates generated by the biometric recognition system in a biometric database,
(iv) searching means for searching the biometric database for a stored biometric template linked with an identifying parameter,
(v) a second processor means for comparing and scoring the correspondence of two biometric templates using the installed biometric recognition system; and
(vi) communication means for bi-directional communication with the communication control device.

23. An identity verification system, the verification system comprising:
(a) a plurality of data input stations, each data input station comprising (i) a referenced data input device associated with a data identification code, (ii) at least one entry means for recording a set of biometric data, wherein each entry means is associated with a biometric identification code, and (iii) display means for displaying information to a system operator;

(b) a communication control device remote from said data input stations, said communication control device having (i) receiving means for receiving the set of biometric data linked with the biometric identification code and a set of input data from the data input device linked with the data identification code, (ii) a first conversion means for selectably capturing a portion of the set of biometric data received from the entry means and converting said portion of captured biometric data into a compressed digital file of the captured biometric data linked to the biometric identification code, (iii) a second conversion means for formatting the set of input data into a network protocol standard linked to the data identification code, and (iv) transmitting means for transmitting data from the communication control device to the display;

(c) a plurality of keycatcher units;

(d) a plurality of interactive local communication stations, each communication station comprising (i) a local central processing unit, (ii) a keyboard, (iii) a monitor, and (iv) a data input apparatus; and (e) at least one system central processing unit remote from the communication control device and in direct communication with the communication control device having (i) an installed biometric recognition system, (ii) a first processor means for generating a biometric template from the captured biometric data using the installed biometric recognition system, (iii) a second processor means for comparing and scoring the correspondence of two biometric templates using the installed biometric recognition system;

(iv) storage means for storing a set of biometric templates generated by the biometric recognition system in a biometric database, (iv) searching means for searching the biometric database for a stored biometric template linked with an identifying parameter, and (vi) communication means for bi-directional communication with the communication control device.

24. An identity verification system, the verification system comprising:

(a) a plurality of referenced data input devices wherein each referenced data input device is associated with a data identification code;

(b) a plurality of cameras for recording photographic images, wherein each camera is associated with a camera identification code;

(c) a display means for displaying information to a system operator;

(d) a communication control device remote from the data input devices, the cameras and the display means, said communication control device including (i) a camera server having a video engine in communication with at least one camera, wherein the video engine selectably captures a set of photographic images taken with the camera and converts the images into a compressed digital file linked to the camera identification code, a first data conversion engine in communication with at least one data input device, wherein the first data conversion engine captures a set of input data from the data input device and formats the captured data into a network protocol standard linked to the data identification code, and a second data conversion engine, wherein the second data conversion engine formats a set of output data for communication with the display means; and (ii) a main board that connects the camera server to the camera, the data input device, the display means and a computer network.

(e) a plurality of keycatcher units;

(f) a plurality of interactive local communication stations, each communication station comprising (i) a local central processing unit, (ii) a keyboard, and (iii) a monitor; and (g) at least one system central processing unit remote from the communication control device and in direct communication with the communication control device having (i) an installed biometric recognition system, (ii) a first processor means for generating a biometric template from the captured biometric data using the installed biometric recognition system, (iii) a second processor means for comparing and scoring the correspondence of two biometric templates using the biometric recognition system;

(iv) storage means for storing a set of biometric templates in a biometric database, and (iv) searching means for searching the biometric database for a stored biometric template linked with an identifying parameter.

25. A method for image capture and verification comprising:

sending a live video stream of an individual taken with a camera to a communication control device;

capturing a photographic frame out of the video stream;

converting the photographic frame into a compressed digital file;

capturing a set of input data in a common protocol format from at least one data input device;

converting the common protocol formatted data into a network standard protocol;

sending the compressed digital file and converted input data to a central processing unit for image verification or identification; and providing feedback on the status of the verification process to a visual output device.

26. A method for verifying a user's identity and authorizing a transaction, the method comprising the steps of:

entering a user's authorization identifier through a referenced data input device into a communication control device, said communication control device in communication with a CPU;

searching a database of authorized users residing on the CPU for the user's authorization identifier, wherein said database of authorized users links a digitized biometric data file previously obtained from each authorized user with each authorized user's authorization identifier;

activating a biometric data entry mechanism reference-linked to the referenced data input device;

gathering biometric data from the user using the biometric data entry mechanism;

capturing selected biometric data with the communication control device and generating a compressed digitized file from the selected biometric data;

processing the compressed digitized file of selected biometric data though a biometric recognition system residing on the CPU to form a test biometric data file, wherein the test biometric data file is in a comparable format as the previously obtained biometric file linked with the user's authorization identifier in the authorized user database;

comparing the test biometric data file with the previously obtained biometric file linked with the user's authorization identifier in the authorized user database;

providing feedback on the result of the comparison of the test biometric data file with the previously obtained biometric file linked with the user's authorization identifier in the authorized user database to a visual output device associated with the biometric data entry mechanism; and authorizing the transaction if a correspondence in the test biometric data file and the previously obtained biometric file linked with the user's authorization identifier in the authorized user database is detected.

27. The method of claim 26, wherein the user's authorization identifier is a passport number.

28. The method of claim 26, wherein the biometric data entry mechanism is a camera.

29. The method of claim 26, wherein the biometric recognition system is a face recognition system.

30. The method of claim 26, further comprising the step of alerting security if the test biometric data file and the previously obtained biometric file linked with the user's authorization identifier in the authorized user database do not correspond to each other.

31. A face recognition based method for verifying the identity of an individual, the method comprising the steps of:

entering an identifier associated with a person through a referenced data input device into a communication control device, said communication control device in communication with a CPU;

searching an enrolled face database residing on the CPU for the person's identifier, wherein said enrolled face database links a set of stored digitized facial template files of a number of individuals with a set of identifiers of the individuals;

activating a camera reference-linked to the referenced data input device;

gathering a plurality of photographic images of the person;

capturing a set of selected photographic images with the communication control device and generating a compressed digitized image file from the selected photographic images;

transmitting the compressed digitized image file to the CPU;

processing the compressed digitized image file though a face recognition system residing on the CPU to form a test facial template file;

comparing the test facial template file with the stored facial template file associated with the person's identifier in the face database; and providing feedback on the correspondence of the test facial template file with the stored facial template file to a visual output device associated with the biometric data entry mechanism.

32. The method of claim 31, further comprising the step of alerting security if the test facial template file and the stored facial template do not correspond.

33. The method of claim 31, further comprising the step of comparing the test facial template file with each facial template file stored in a face database of unauthorized personnel.

* * * * *